(12) United States Patent
Porter

(10) Patent No.: US 11,716,986 B2
(45) Date of Patent: Aug. 8, 2023

(54) LIFTING JAW MOUSE TRAP TO STORE DEAD MOUSE

(71) Applicant: Daniel Lee Porter, Muckwonago, WI (US)

(72) Inventor: Daniel Lee Porter, Muckwonago, WI (US)

( * ) Notice: Subject to any disclaimer, the term of this patent is extended or adjusted under 35 U.S.C. 154(b) by 69 days.

(21) Appl. No.: 17/565,037

(22) Filed: Dec. 29, 2021

(65) Prior Publication Data

US 2023/0200370 A1      Jun. 29, 2023

(51) Int. Cl.
| | |
|---|---|
| *A01M 23/12* | (2006.01) |
| *A01M 23/26* | (2006.01) |
| *A01M 23/24* | (2006.01) |
| *A01M 23/28* | (2006.01) |

(52) U.S. Cl.
CPC ............ *A01M 23/12* (2013.01); *A01M 23/24* (2013.01); *A01M 23/265* (2013.01); *A01M 23/28* (2013.01)

(58) Field of Classification Search
CPC ..... A01M 23/12; A01M 23/265; A01M 23/24
See application file for complete search history.

(56) References Cited

U.S. PATENT DOCUMENTS

| | | | | |
|---|---|---|---|---|
| 58,826 | A * | 10/1866 | Hollingsworth | A01M 23/12 43/73 |
| 1,512,513 | A * | 10/1924 | Ward | A01M 23/12 43/73 |
| 6,137,415 | A * | 10/2000 | Rast | A01M 23/30 340/384.1 |
| 2018/0235205 | A1 * | 8/2018 | Howard | A01M 23/30 |
| 2023/0029020 | A1 * | 1/2023 | Howard | A01M 23/12 |

* cited by examiner

*Primary Examiner* — Jessica B Wong
(74) *Attorney, Agent, or Firm* — James Earl Lowe, Jr.

(57) ABSTRACT

A mouse catching and killing device and a method of eliminating mice with the mouse catching and killing device, the device including a jaw. The method comprises the steps of holding the jaw open until a mouse is sensed in the jaw, closing the jaw when a mouse is sensed in the jaw, providing a mechanism on a frame for moving the jaw to over a storage bin, opening the jaw so that the mouse falls from the jaw into the storage bin, and then returning the trap to its mouse ready position.

3 Claims, 10 Drawing Sheets

LIFTING JAW MOUSE TRAP TO STORE DEAD MOUSE

BACKGROUND

The present disclosure relates to devices for trapping and killing small rodents such as mice.

Conventional mouse traps need to be set in a location to capture mice. The trap needs to be prepared for trapping the mice, often by placing the mouse trap into a mouse ready position. Some conventional devices kill a mouse while trapping a mouse, while with others, after capturing the mouse, it is necessary to also kill the mice, such as by drowning or electrocution. Such devices are often relatively large and not easily transported or set up in locations such as an attic in a home.

A need exists for a single compact device, not limited by its size or form factor, that, when placed into a mouse ready position, can capture and kill mice and reset itself automatically, so that multiple mice can be captured.

SUMMARY

Disclosed is a mouse catching and killing trap and a method of eliminating mice with the mouse catching and killing device, the device including a jaw. The method comprising the steps of holding the jaw open until a mouse is sensed in the jaw, closing the jaw when a mouse is sensed in the jaw, providing a mechanism on a frame for moving the jaw to over a storage bin, opening the jaw so that the mouse falls from the jaw into the storage bin, and then returning the trap to its mouse ready position.

In one embodiment, the mouse catching and killing device includes a front wall that inhibits mouse movement after it enters the jaw. The jaw maintains pressure on the mouse for a predetermined period after snapping closed to enhance the kill effectiveness of the trap. The jaw is also sufficiently larger than many conventional traps thereby enhancing its striking effectiveness.

The disclosed mouse catching and killing trap is more humane than many conventional traps for it does not drown or electrocute the mice. Further, mouse disposal is easier than with conventional traps that drown mice, for mice remain dry until disposed of and there is no need to empty a bucket filled with water and wet mice. Since the disclosed mouse catching and killing trap is compact, it can be placed anywhere along natural pathways for mice, and it provides easy access to the jaw for the mice. There is no need for new mice to travel over mice that have already been killed, and the mouse disposal bin is relatively large. The trap also is powered by standard batteries for many cycles thereby making it easy to maintain and to use.

Figure 1:
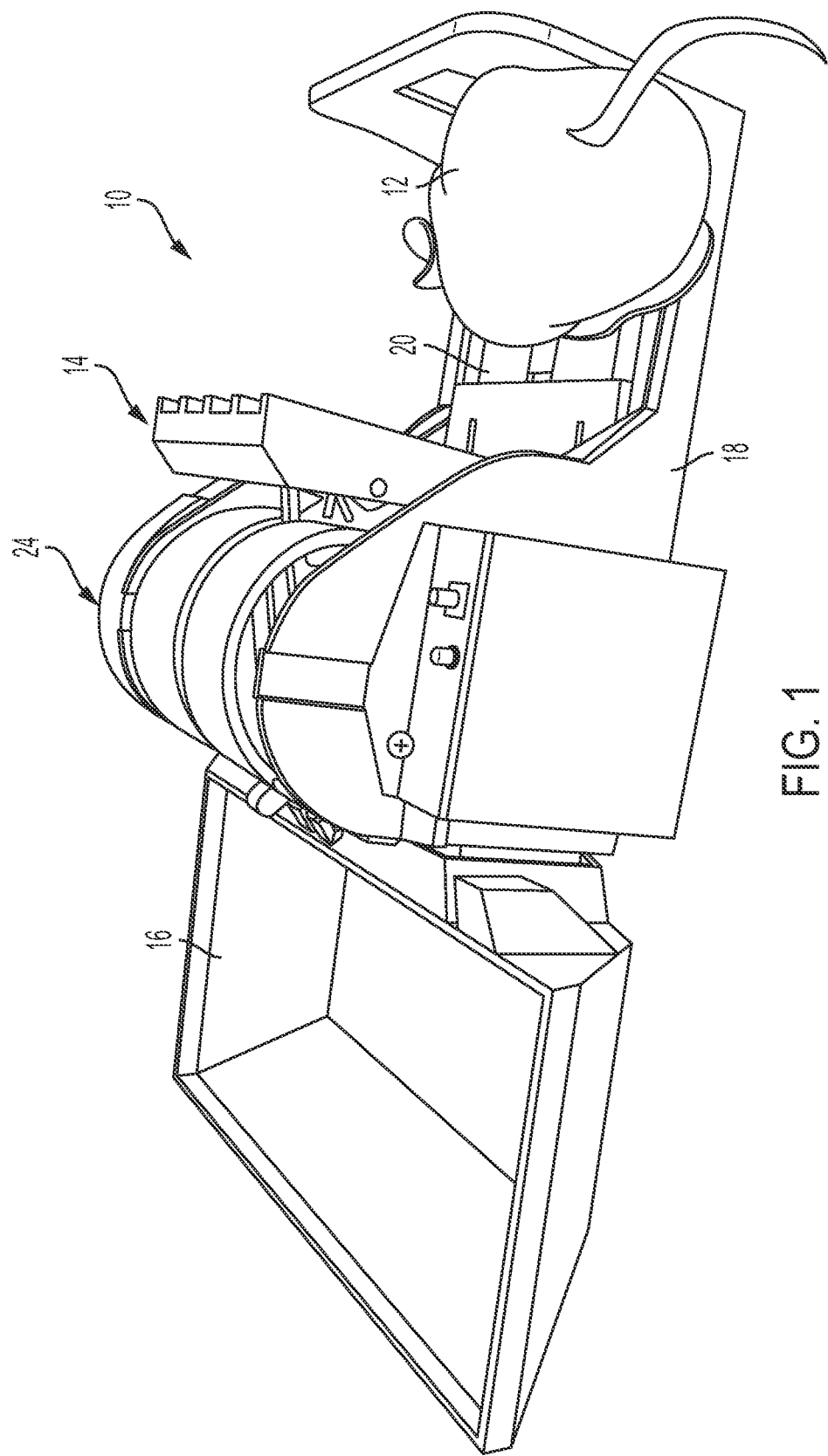
FIG. 1 is a side perspective view of a mouse trap according to this disclosure in its set position.
Figure 2:
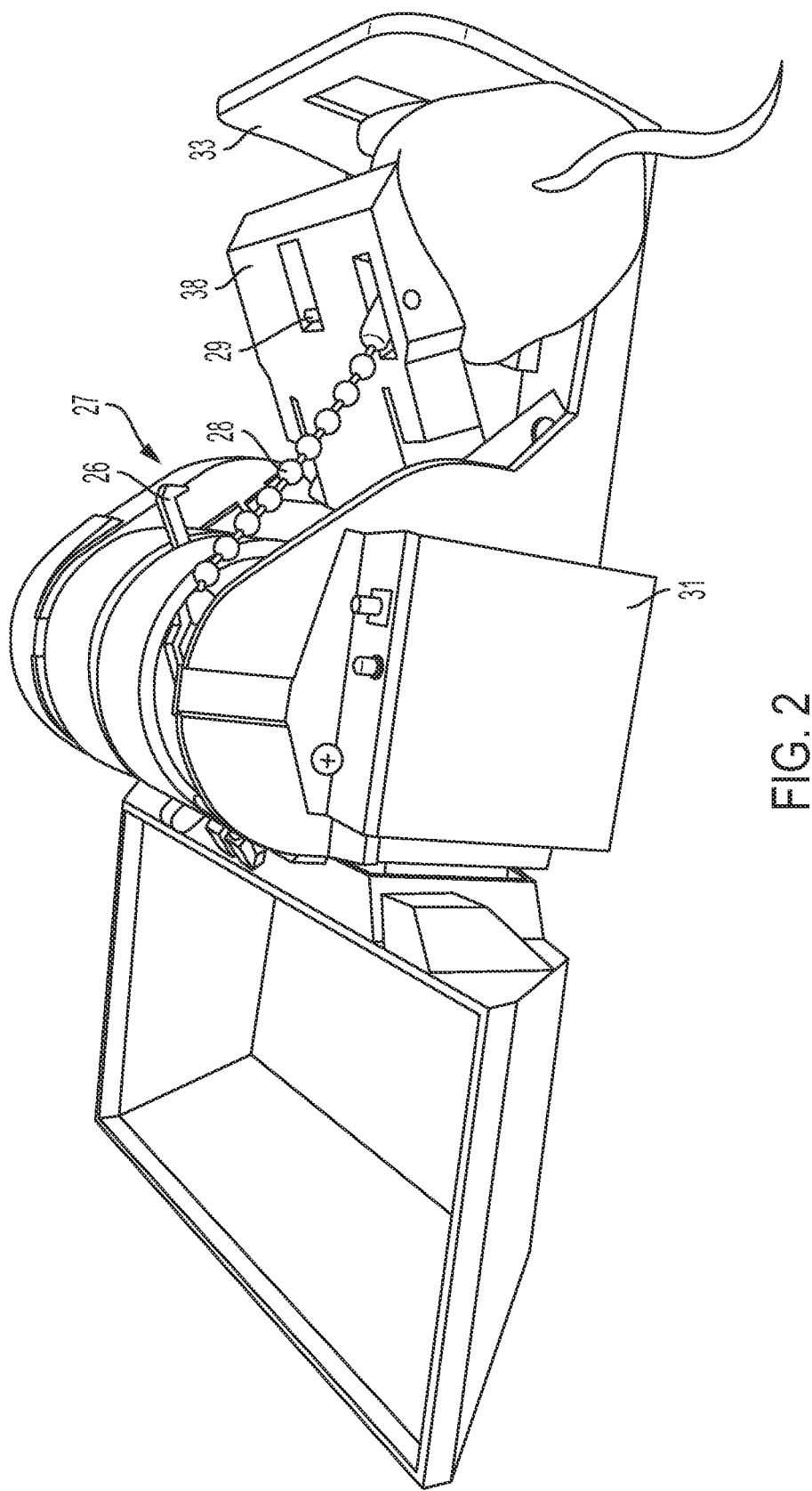
FIG. 2 is a side perspective view with a mouse in the mouse trap.
Figure 3:
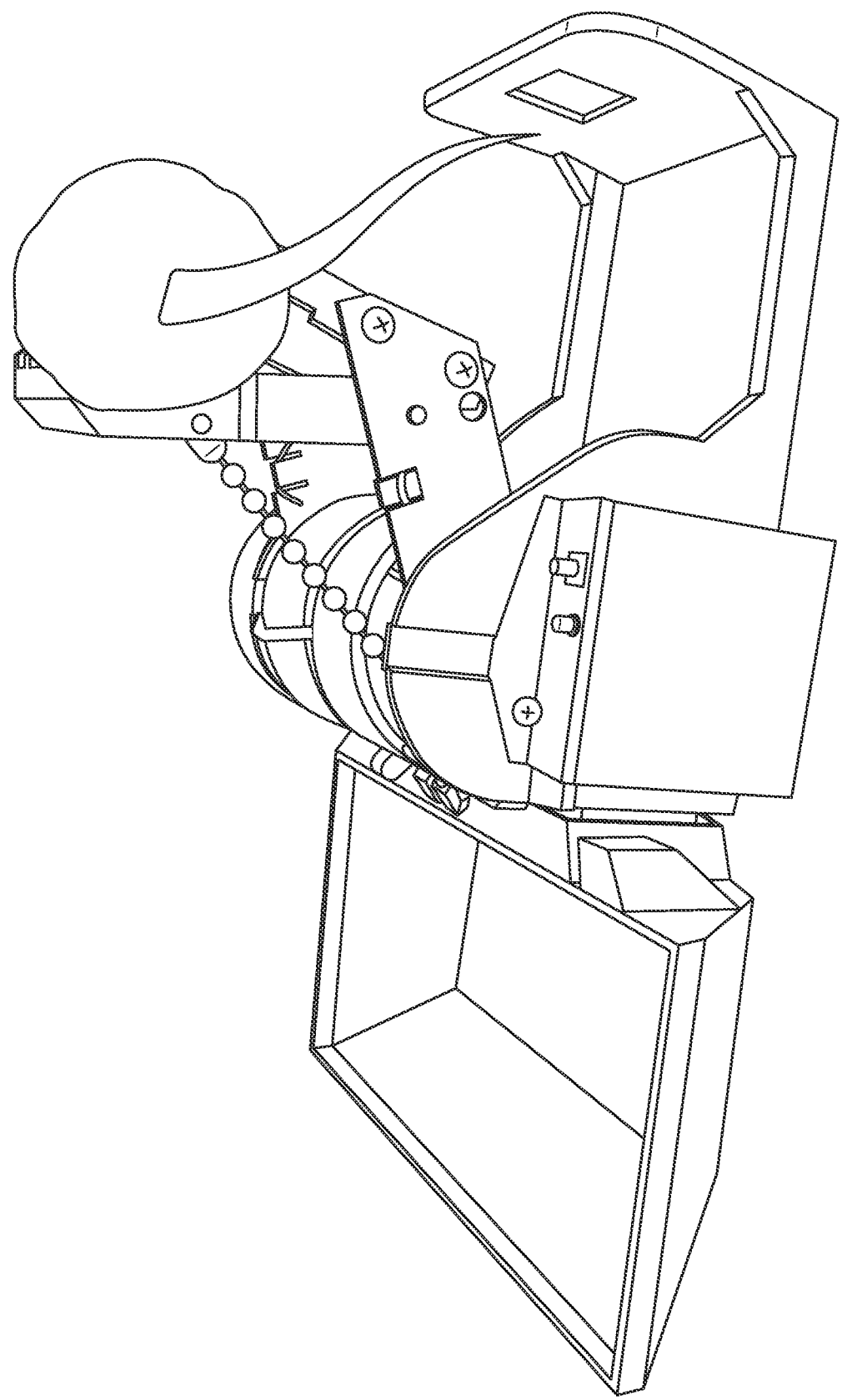
FIG. 3 is a side perspective view with the trapped mouse raised up from the set position.
Figure 4:
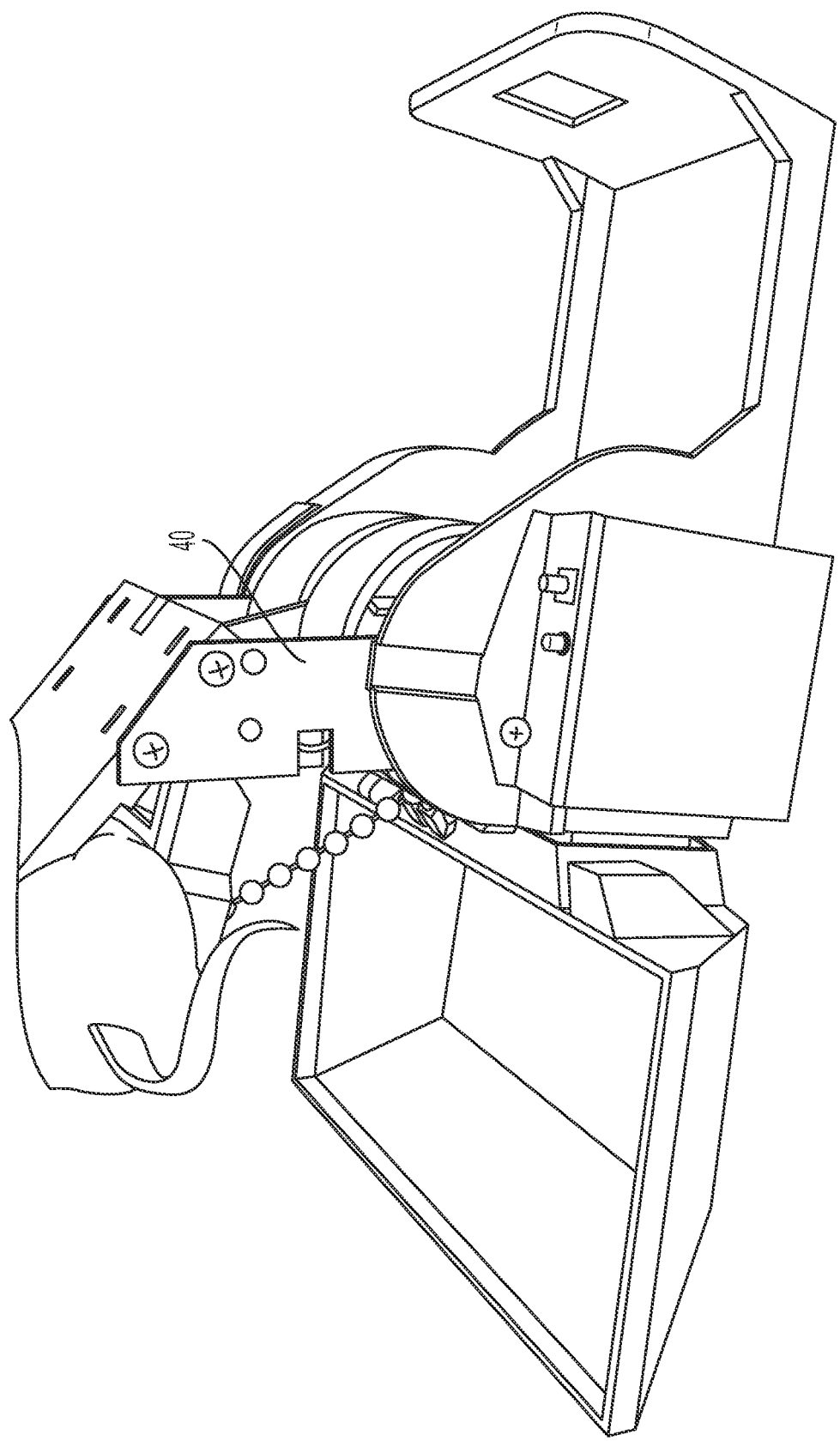
FIG. 4 is a side perspective view of the mouse trap with the trap above the mouse storage bin.

Before one embodiment of the disclosure is explained in detail, it is to be understood that the disclosure is not limited in its application to the details of the construction and the arrangements of components set forth in the following description or illustrated in the drawings. The disclosure is capable of other embodiments and of being practiced or being carried out in various ways. Also, it is to be understood that the phraseology and terminology used herein is for the purpose of description and should not be regarded as limiting. Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Further, it is to be understood that such terms as "forward", "rearward", "left", "right", "upward" and "downward", etc., are words of convenience and are not to be construed as limiting terms.

DESCRIPTION OF THE PREFERRED EMBODIMENT

Illustrated in FIGS. 1 to 10 is a mouse trap 10 according to this disclosure. The mouse trap 10 eliminates mice 12 with a mouse catching and killing jaw 14. The mouse trap 10 holds the jaw 14 open and then closes the jaw 14 when a mouse 12 is sensed in the jaw 14. A disposal mechanism 24 including a frame 18 and an arm 40 moves the jaw 14 to over a storage bin 16, opens the jaw 14 so that the mouse 12 falls from the jaw 14 into the storage bin 16, and then returns the jaw 14 to its mouse ready position. An axle 54 (see FIG. 10) is mounted on the frame 18 and attached to the arm 40 so that the arm 40 is pivotable relative to the frame 18.

The frame 18 has a horizontal piece 19 and a front wall 33 connected to the horizontal piece 19. The frame 18 also includes side walls 21 connected to the horizontal piece 19 for supporting the axle 54. The jaw 14 in its set position is located between the axle 54 and the front wall 19, the front wall 19 serving to help keep mice that enter the jaw 14 within the jaw 14. The front wall 19 also has a centrally located indentation 23 therein by the jaw 14 for supporting a mouse attracting substance, such as peanut butter (not shown).

Figure 5:
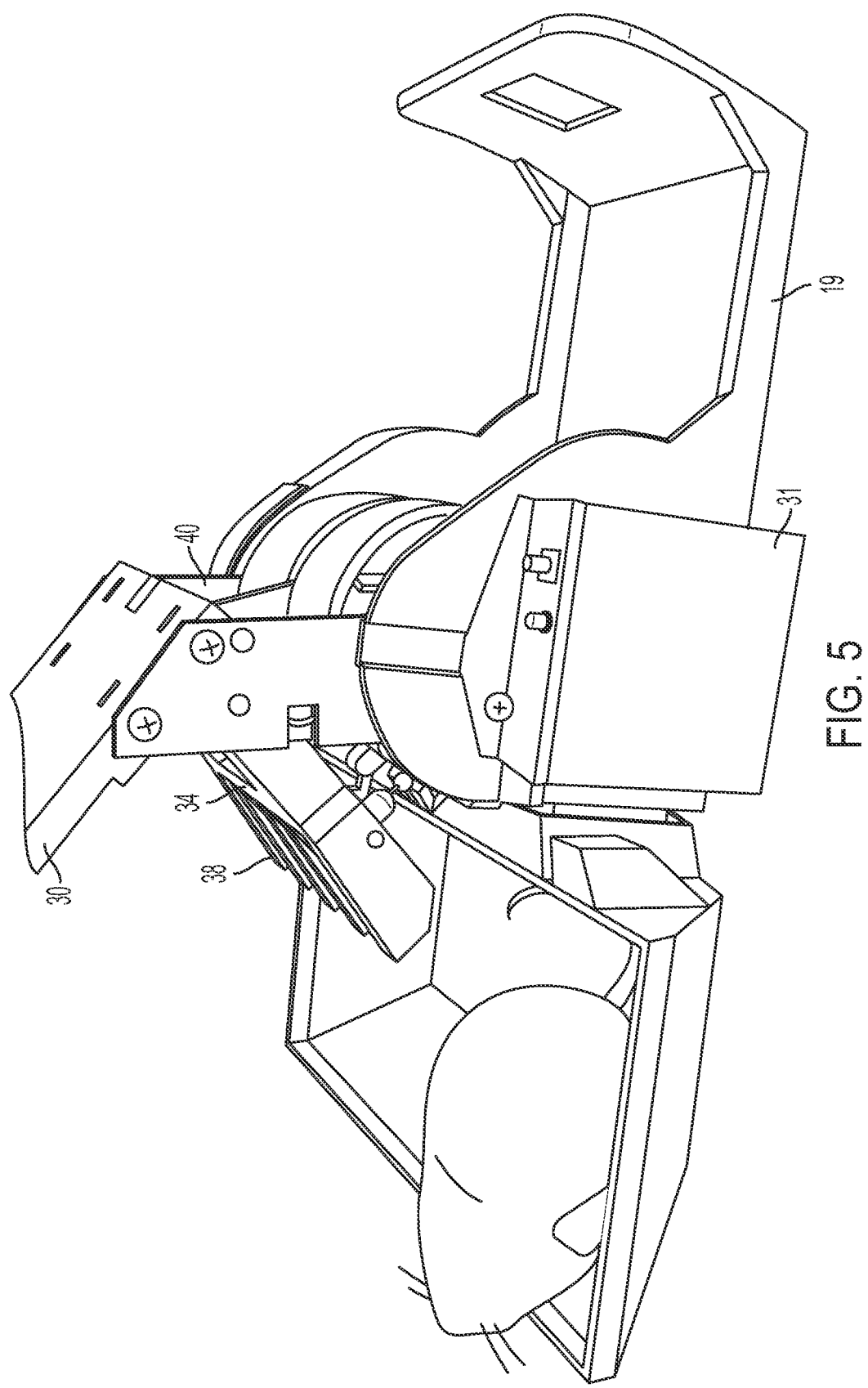
FIG. 5 is a side perspective view of the mouse trap open with the mouse in the mouse storage bin.
Figure 6:
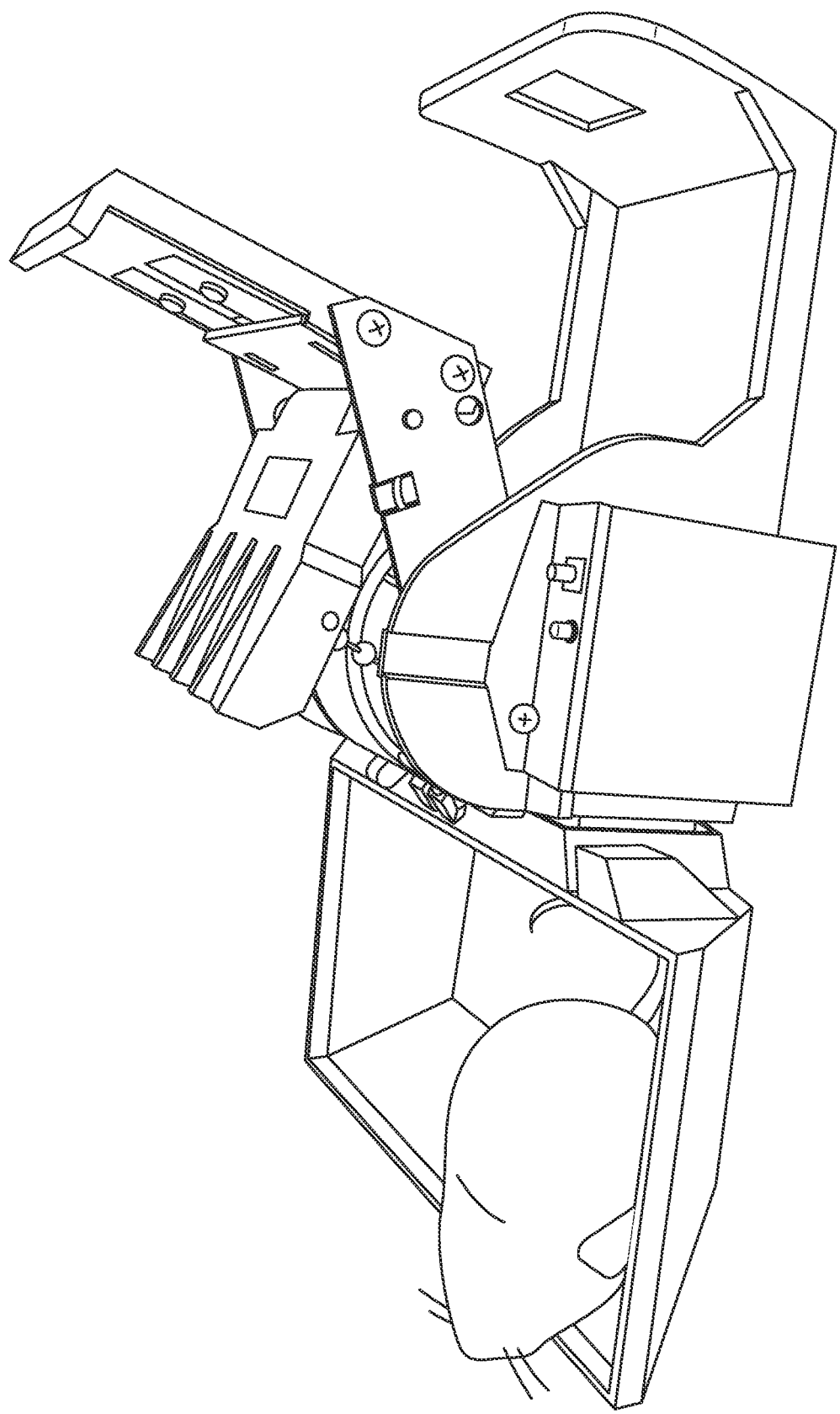
FIG. 6 is a side perspective view with of the mouse trap returning to its set position.

As shown in FIG. 5, the jaw 14 includes a lower plate 30 and an upper plate 34 pivotally connected to the lower plate 30. More particularly, the arm 40 is in the form of two spaced apart arm pieces connected to opposite sides of the lower plate 30. Further, the upper plate 34 has spaced apart parallel ridges 38 for aiding in engaging the mouse 12 and for concentrating impact force.

Figure 10:
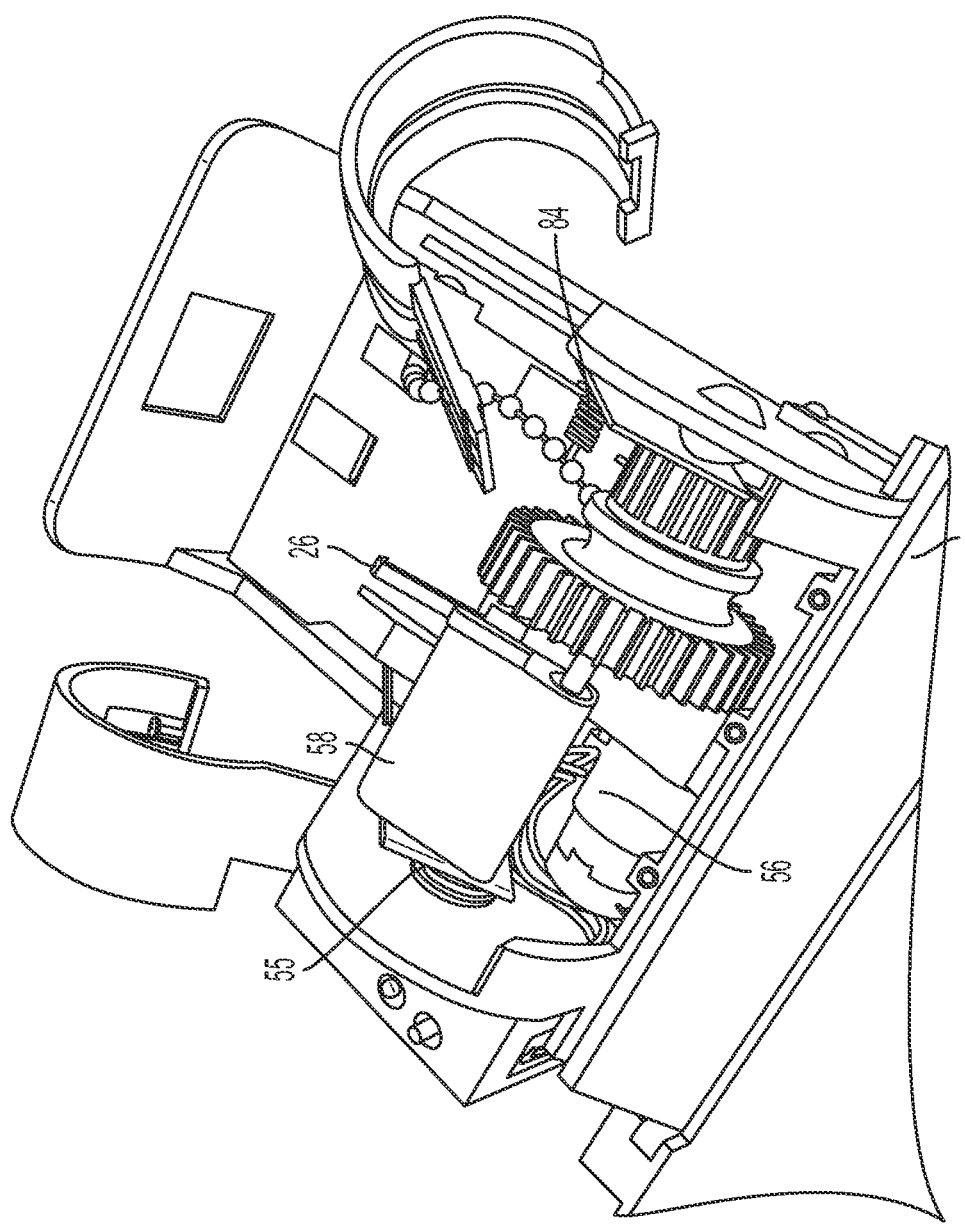
FIG. 10 is a rear perspective view of the mouse trap with motor covers moved to the side.

A sensor 20 is located on the lower plate 30 for detecting the presence of the mouse in the jaw. In one embodiment, the sensor 20 is in the form of two spaced apart contact plates, but in other embodiments (not shown), other sensing mechanisms can be used. A microcontroller 62 (see FIG. 7) for operating the trap 10 is in electrical communication with the sensor 20 and responses to the mouse 12 contacting the two spaced apart contact plates 20. The microcontroller 62 is housed in a microcontroller housing 31 attached to one of the side walls 21. The mouse trap 10 also includes a pair of jaw springs 84 (one is shown in FIG. 10) between the upper plate 34 and the lower plate 30 for snapping the upper plate 34 onto the lower plate 30.

An empty/set motor 56 (see FIGS. 7 and 10) is also mounted on the frame 18, as is a catch 27 for holding and releasing the upper plate 34, the catch 27 including a latch motor 58 mounted on the axle 54, and a latch 26 pivotally movable by the latch motor 58 to between a latch engaged position and a latch released position. A notch 29 (see FIG. 2) on the upper plate 34 is releasably engageable by the latch 26.

Figure 7:
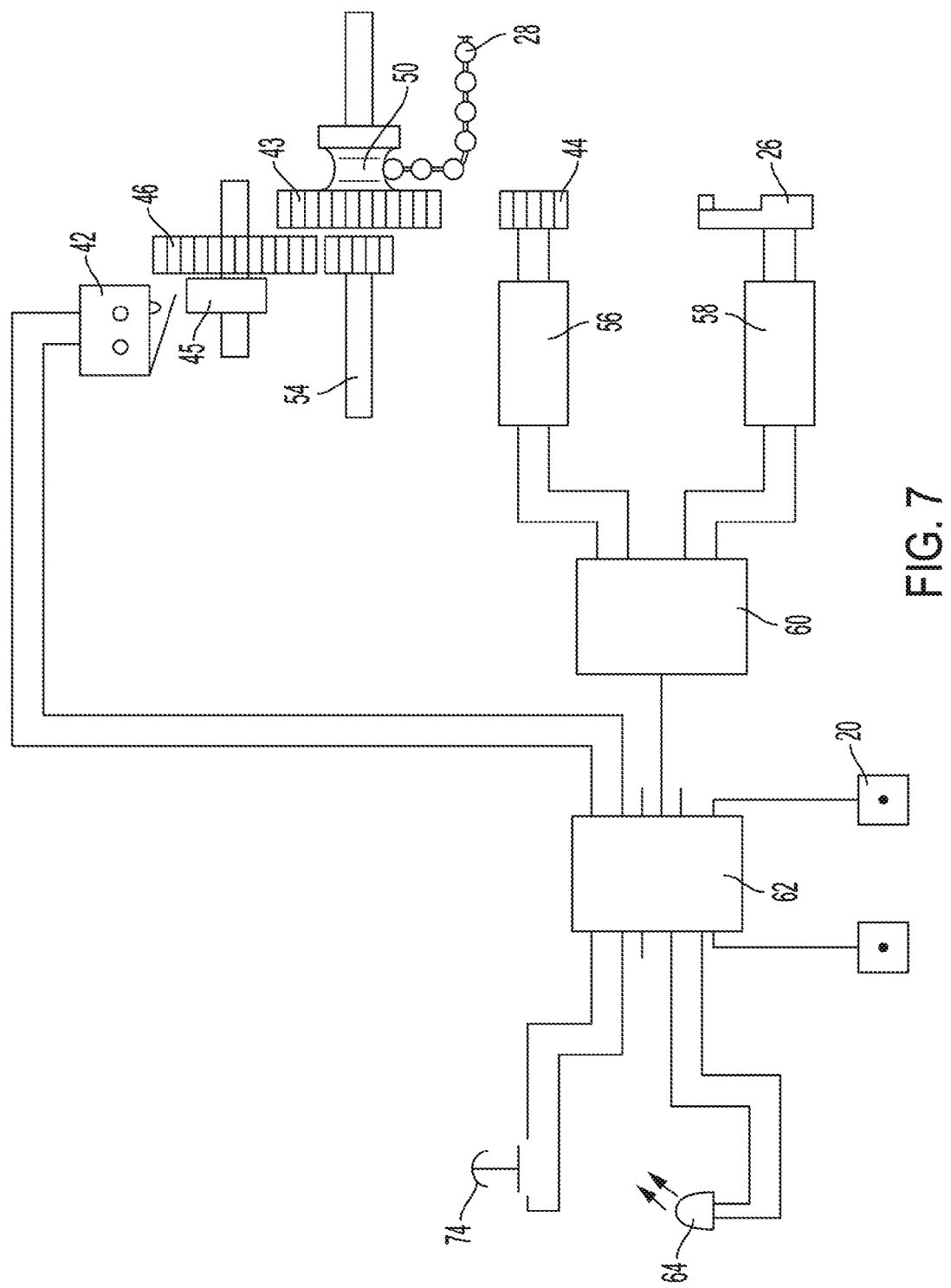
FIG. 7 is a schematic of the mechanism for moving and operating the mouse trap.
Figure 8:
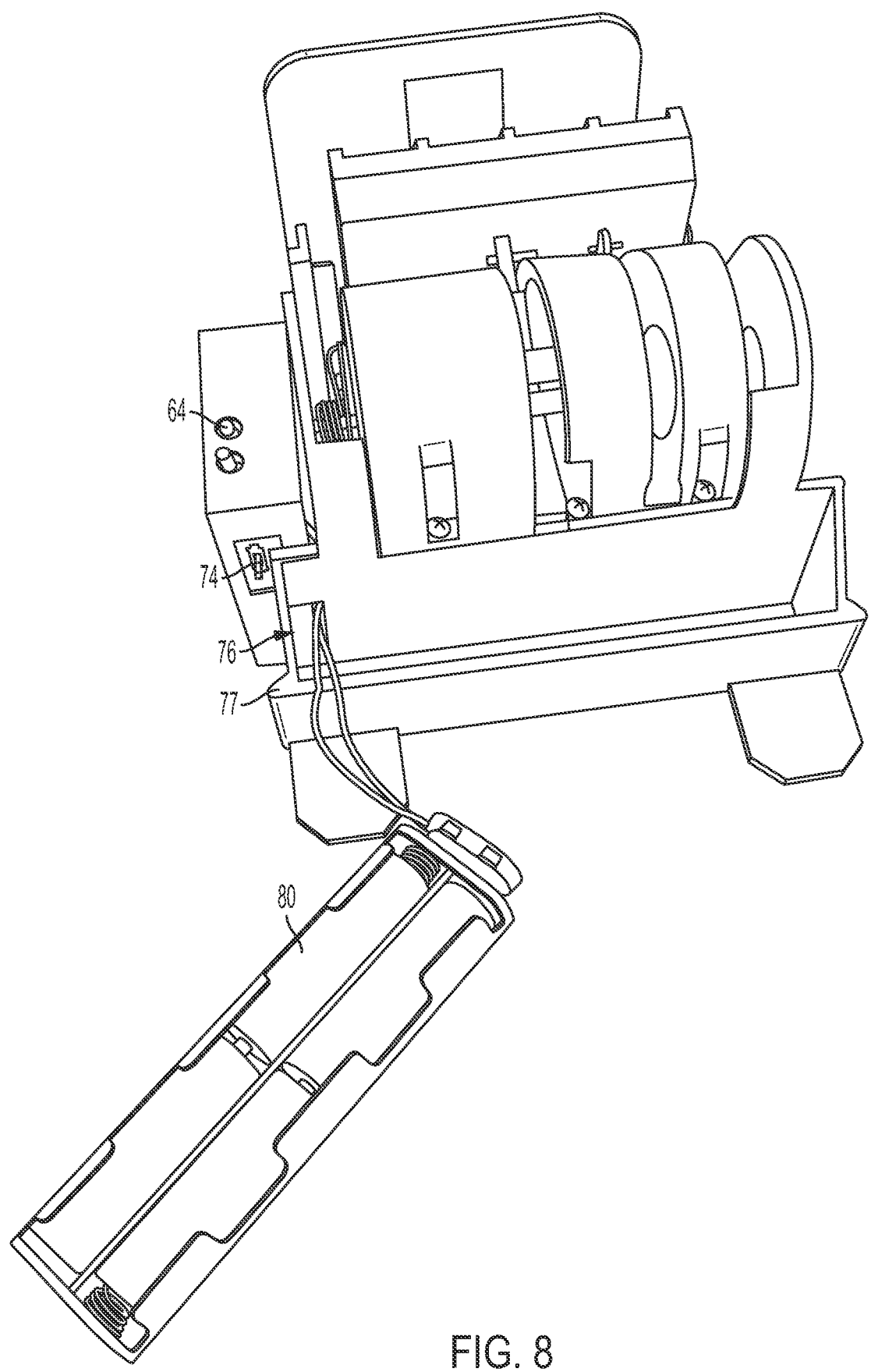
FIG. 8 is a rear perspective view of the mouse trap with the battery storage unit out outside of the mouse trap.
Figure 9:
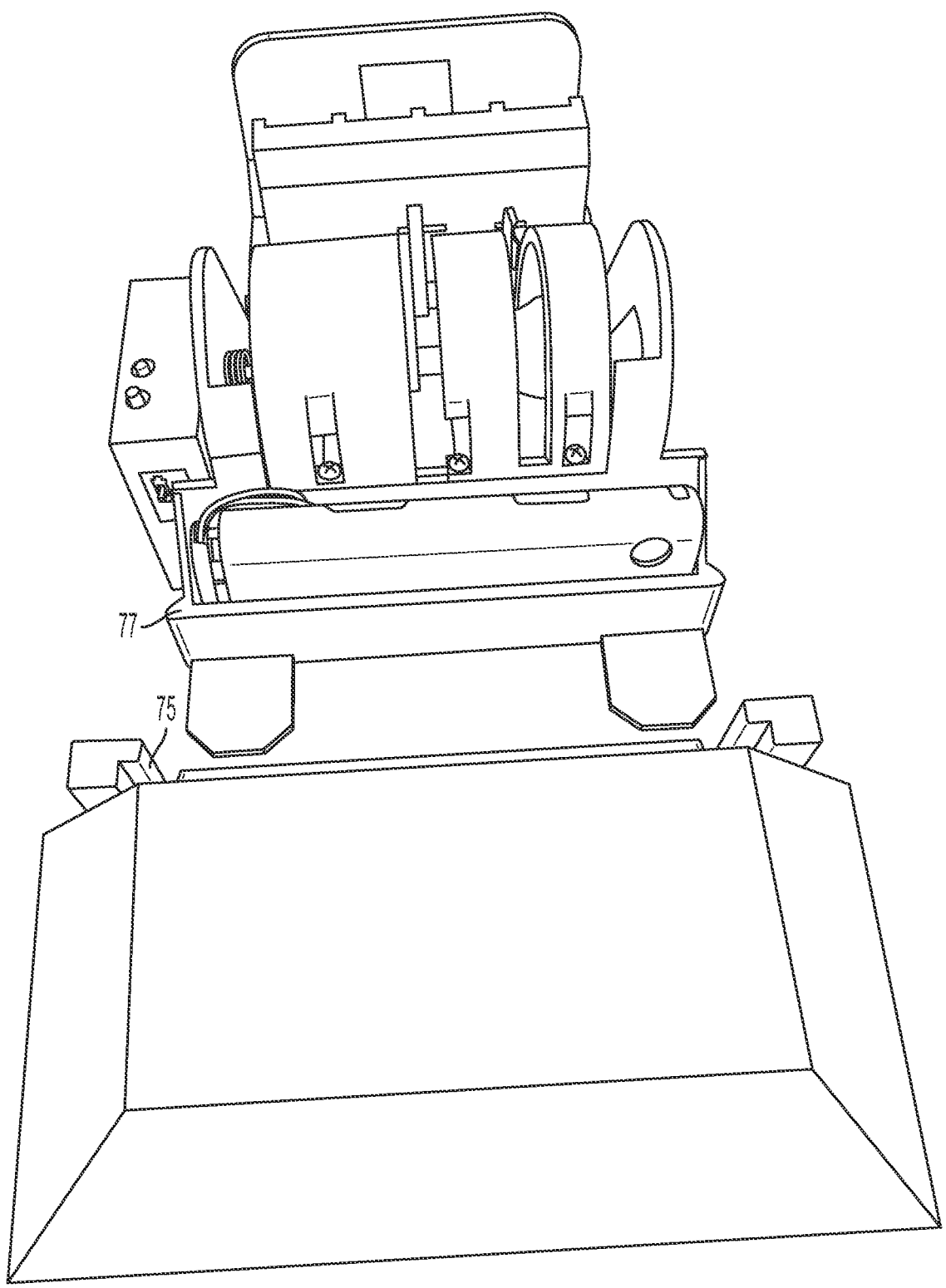
FIG. 9 is a rear perspective view of the battery storage unit in the battery storage compartment with the mouse storage tray upside down.

A pull chain 28 is connected to the empty set motor 56 for pulling the jaw 14 over the mouse storage bin 16 and for pivoting the upper plate 34 relative to the lower plate 30 to open the jaw 14 and release the mouse 12. More particularly, as illustrated in FIG. 7, the chain 28 is wrapped around and pulled by a chain wrap wheel 50 on the axle 54 in response to the chain wrap wheel 50 rotating in one direction by a chain axle gear 43 rotatably connected to an empty/set gear 44 operated by the empty/set motor 56. The chain 28 is relaxed when the chain wrap wheel 50 is rotated by the empty/set motor 56 in an opposite direction. The chain 28 is attached to the upper plate 34. Rotation of the axle 54 also rotates a cam gear 46 connected to a cam 45 which rotates when the axle 54 rotates. A return spring 55 is between the arm 40 and the frame 18 for biasing the arm 18 to the trap set position when the pull chain 28 is relaxed.

A limit switch 42 is engaged by the cam 45 when the jaw 14 is over the mouse storage bin 16, the limit switch 42 serving to tell the microcontroller 62 to tell a motor controller integrated circuit 60 to stop rotation of the empty/set motor 56, to tell the latch motor 58 to move the latch 26 to engage the notch 29 in the upper plate 34, and then to tell the empty/set motor 56 to relax the chain 28 to relax to allow the arm return spring 55 to pivot the arm 40 to return the jaw 14 to the trap set position.

A battery 80 is electrically connected to the empty/set motor 56, latch motor 58 and the microcontroller 62, the battery 80 being stored in a battery compartment 76 mounted on the frame horizontal piece 19. Four AA batteries have powered the trap 10 for over 300 trap cycles. A mouse storage bin portion 73 of the mouse storage bin 16 covers the top of the battery compartment 76, the mouse storage bin portion 73 releasably connecting to the battery compartment 76 by notches 75 which engage flanges 77 on the ends of the battery compartment 76.

The operation of the device 10 works as follows. A power on switch 74 is moved to its on position. The microcontroller 62 checks and then displays the condition of the battery 80. An LED 64 flashes three times, green-green-green full battery, green-green-red ⅔ left, green-red-red ⅓ left. red-red-red battery empty. The microcontroller 62 tells the motor controller integrated circuit 60 to turn on the latch motor 58 to release the upper plate 34 (snaps the trap), and then turns off after 0.5 seconds.

The microcontroller 62 then tells the motor controller integrated circuit 60 to turn on the empty/set motor 56 which sends the arm 40 to the empty position. When the limit switch 42 is pushed by the cam 45, the limit switch 42 tells the microcontroller 62 that the jaw 14 is in the empty position. The empty/set motor 56 is turned off and the latch motor 58 is turned on latching the upper plate 34 in the set position. The latch motor 58 is turned off and the empty/set motor 56 is turned on in the set direction. When the limit switch 42 is pushed by the cam 45 it tells the microcontroller that the jaw 14 is in the set position and all motors are turned off. The microcontroller 62 then enables the touch pads 20. At this point the trap is set, ready to catch the mouse 12.

When the mouse 12 touches both pads 20, the microcontroller 62 turns on the latch motor 58 to release the upper plate 34. It waits 0.5 seconds then turns off the latch motor 58. The microcontroller 62 waits 10 minutes, and then repeats the steps in the preceding paragraphs. The 10-minute period can be varied in other embodiments but should be long enough to ensure the mouse is ready for the mouse storage bin.

In actual use, the mouse trap 10 has easily caught 7 or more mice in an attic in a single evening.

Various other features of this disclosure are set forth in the following claims.

The invention claimed is:

1. A mouse trap including:
   a frame,
   a jaw for ensnaring a mouse, the jaw including a lower plate and an upper plate pivotally connected to the lower plate,
   a sensor for detecting the presence of the mouse in the jaw, and
   a microcontroller for operating the trap in electrical communication with the sensor, and
   a disposal mechanism attached to the jaw and the frame and operable by the microcontroller for returning the jaw to a mouse ready to capture position, the disposal mechanism including:
   a lifting arm attached to the jaw and to the frame for lifting the jaw and mouse up over a dead mouse storage area,
   an axle mounted on the frame and attached to the arm,
   an empty/set motor mounted on the frame,
   a catch for holding and releasing the upper plate, the catch including
   a latch motor mounted on the axle, and
   a latch pivotally movable by the latch motor to between a latch engaged position and a latch released position,
   a notch on the upper plate releasably engageable by the latch,
   a jaw spring between the upper plate and the lower plate for snapping the upper plate onto the lower plate,
   a pull chain connected to the empty set motor for pulling the jaw over the mouse storage and opening the upper plate,
   a return spring between the arm and the frame biasing the arm to the trap set position, and
   a limit switch engaged when the jaw is over the mouse storage, the limit switch serving to stop rotation of the jaw motor, move the latch to engage top plate, and then return the jaw to the trap set position.

2. A mouse trap according to claim 1 wherein the top plate has space apart parallel ridges thereon.

3. A mouse trap according to claim 1 wherein the frame has a front wall adjacent the jaw.

* * * * *